United States Patent [19]
Dietrich, Sr.

[11] Patent Number: 5,080,178
[45] Date of Patent: Jan. 14, 1992

[54] AGRICULTURAL TILLAGE IMPLEMENT WITH IMPROVED SOIL LEVELER USING STAGGERED DISCS

[75] Inventor: William J. Dietrich, Sr., Congerville, Ill.

[73] Assignee: DMI, Inc., Goodfield, Ill.

[21] Appl. No.: 608,207

[22] Filed: Nov. 2, 1990

[51] Int. Cl.⁵ .................... A01B 49/02; A01B 5/08
[52] U.S. Cl. ................... 172/153; 172/182; 172/574; 172/196
[58] Field of Search ............. 172/152, 153, 174, 181, 172/182, 520, 574, 572, 195, 196, 701; 111/193

[56] References Cited
U.S. PATENT DOCUMENTS

| | | |
|---|---|---|
| 588,787 | 8/1897 | Atkins . |
| 642,273 | 1/1900 | White . |
| 710,303 | 9/1902 | Rentsch . |
| 736,963 | 8/1903 | Ham . |
| 1,758,132 | 5/1930 | Stockton . |
| 2,225,204 | 12/1940 | Benjamin ............... 172/520 |
| 2,420,973 | 5/1947 | Peterson ............... 172/574 |
| 2,486,442 | 11/1949 | Silver . |
| 2,582,538 | 1/1952 | Flynn . |
| 2,659,291 | 11/1953 | Tanke . |
| 2,734,439 | 2/1956 | Padrick . |
| 3,718,191 | 2/1973 | Williams . |
| 3,923,103 | 12/1975 | Davis et al. ............... 172/701 |
| 4,116,140 | 9/1978 | Anderson et al. ............... 172/572 |
| 4,192,388 | 3/1980 | Goebel ............... 111/193 |
| 4,279,311 | 7/1981 | Dietrich, Sr. . |
| 4,295,532 | 10/1981 | Williams . |
| 4,418,761 | 12/1983 | Dietrich, Sr. . |
| 4,425,973 | 1/1984 | Williams . |
| 4,429,750 | 2/1984 | Pope ............... 172/182 |
| 4,431,061 | 2/1984 | White . |
| 4,483,401 | 2/1984 | Robertson . |
| 4,560,011 | 12/1985 | Peterson . |
| 4,574,715 | 3/1986 | Dietrich, Sr. et al. ............... 172/182 |
| 4,623,024 | 11/1986 | Schilenker ............... 172/572 |
| 4,682,658 | 7/1977 | Erickson ............... 172/182 |
| 4,759,411 | 7/1988 | Williamson ............... 172/572 |
| 4,762,181 | 10/1988 | Cox ............... 172/196 |
| 4,779,684 | 10/1988 | Schultz . |
| 4,883,127 | 11/1989 | Chevrier ............... 172/574 |
| 4,896,443 | 1/1990 | Klingler . |

Primary Examiner—Dennis L. Taylor
Assistant Examiner—Samson Warnick
Attorney, Agent, or Firm—Emrich & Dithmar

[57] ABSTRACT

A primary tillage implement having a plurality of chisel plows mounted in lateral spacing on a forward bar, also has a plurality of disc levelers mounted on a rear bar. Each disc leveler assembly is laterally spaced from and centered between the paths of adjacent, leading chisel plow shanks and includes a pair of discs angled outwardly to move some of the soil from the ridge formed by adjacent chisel plows to the furrow formed by an associated chisel plow. The discs of a pair are staggered and spaced laterally apart to leave a narrow band of loose soil in the ridge between the discs which falls into the shallow grooves formed by the discs after they pass. Soil is thus laterally displaced from the ridge to adjacent grooves to level the soil.

16 Claims, 3 Drawing Sheets

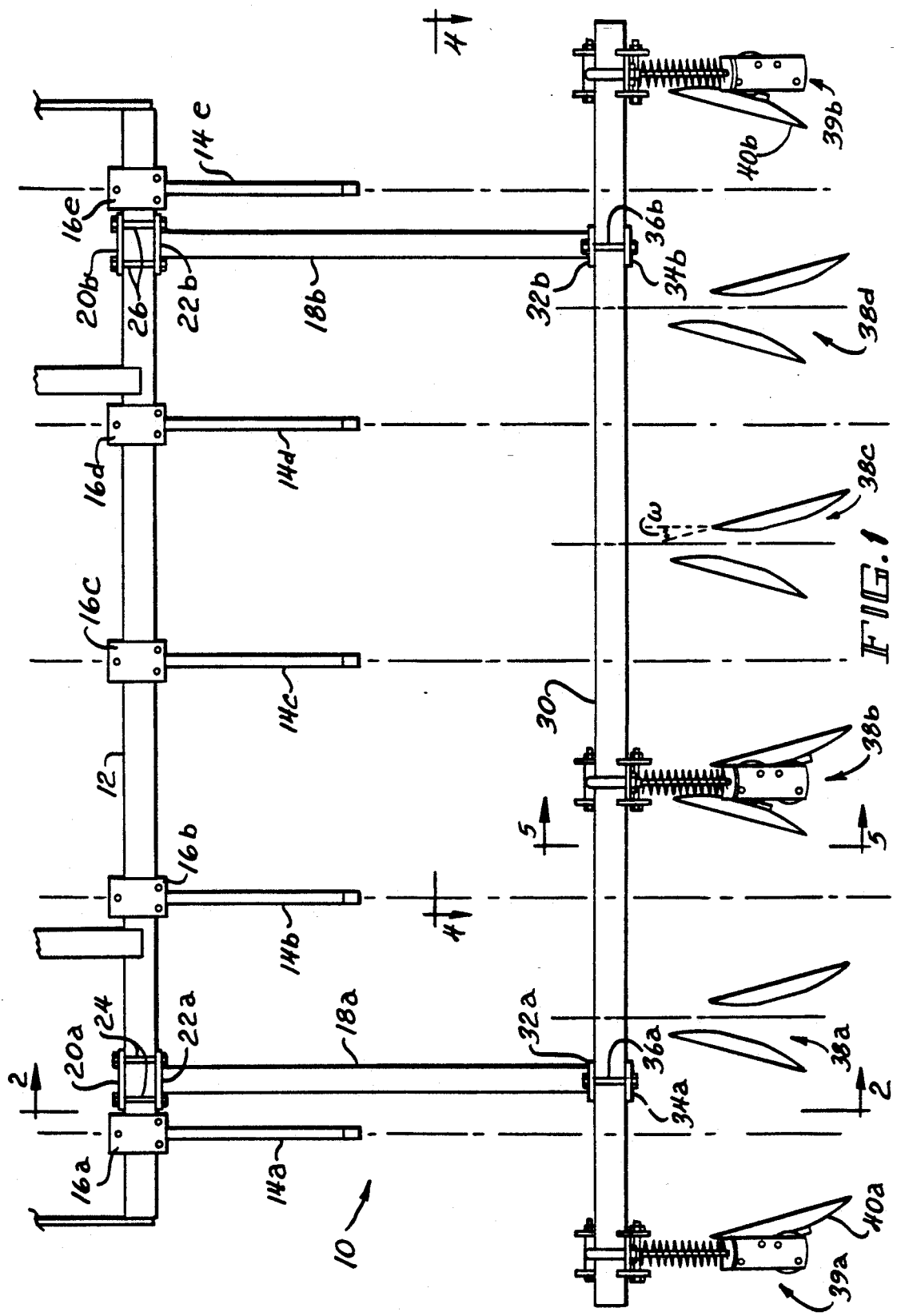

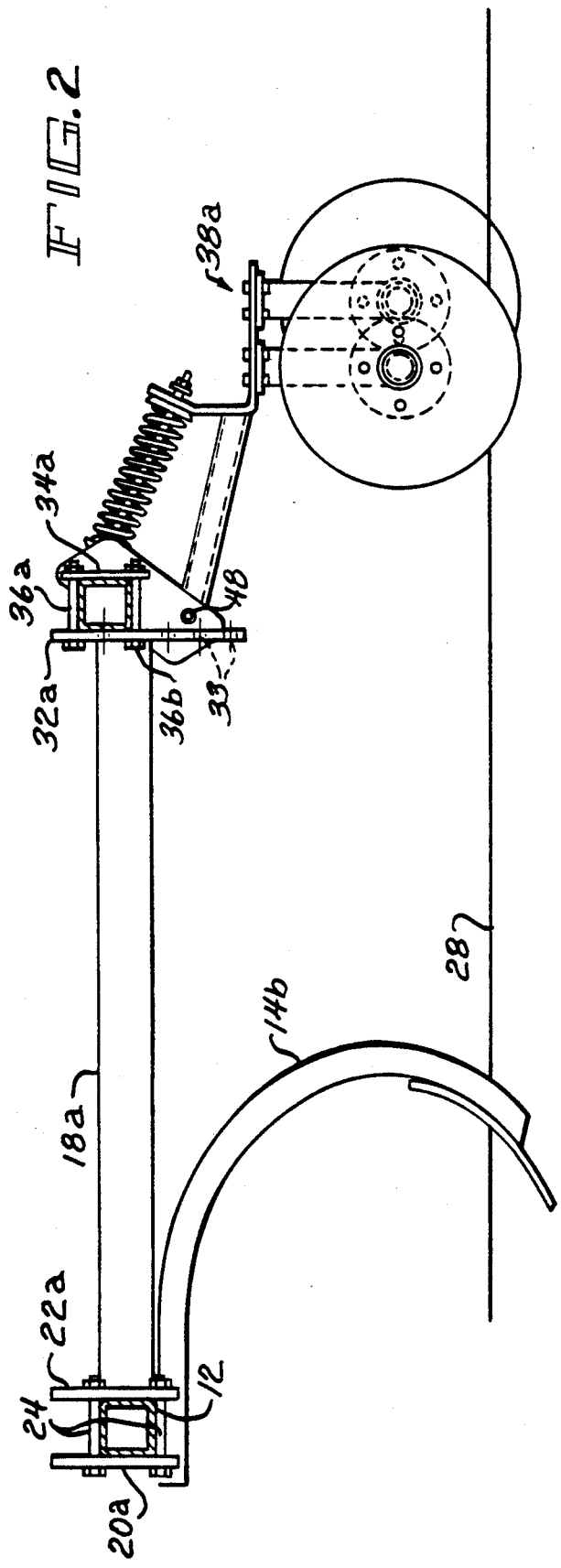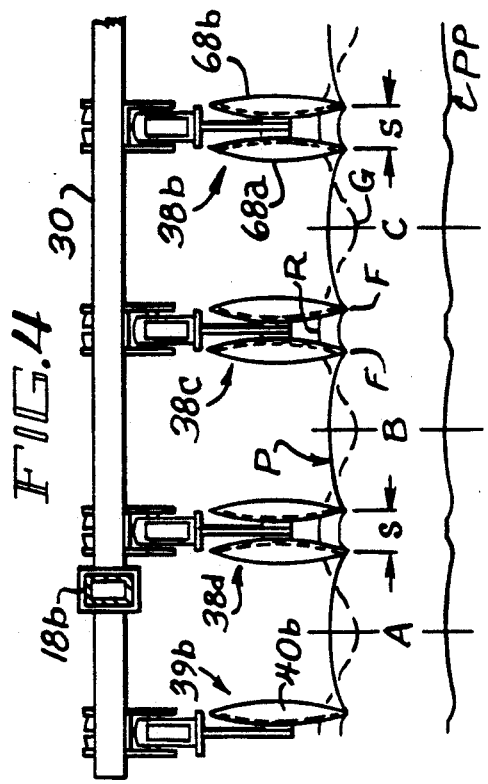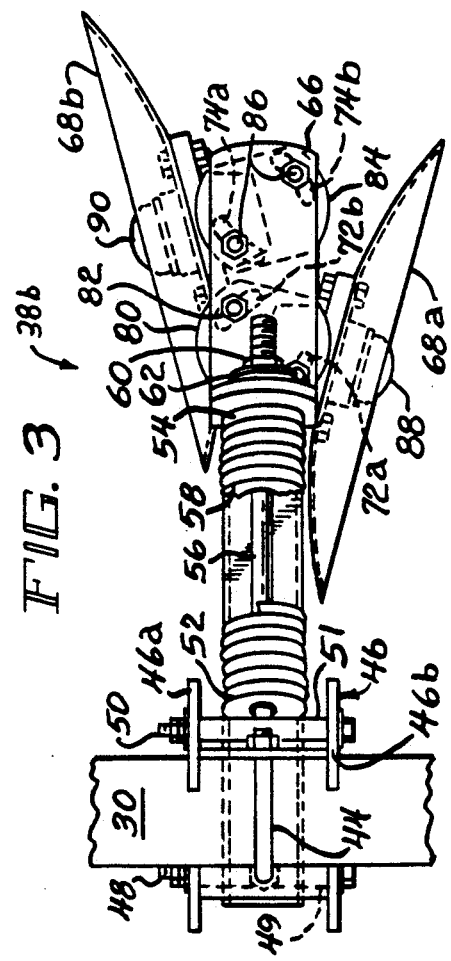

AGRICULTURAL TILLAGE IMPLEMENT WITH IMPROVED SOIL LEVELER USING STAGGERED DISCS

FIELD OF THE INVENTION

The present invention relates generally to primary tillage implements used in agriculture, and is particularly directed to a chisel plow with improved levelers to achieve a more even or level profile after a single pass of the plow.

BACKGROUND OF THE INVENTION

During the 1970's, chisel plows became popular in the corn belt of the United States, replacing many moldboard plows for fall primary tillage.

A chisel plow creates a series of grooves or furrows left by the chisel shanks and ridges created by soil thrown laterally by the plow points. However, with high ridges left in the fall, preparing the soil for planting in the spring became more difficult because discs or other surface preparation implements had to be operated much deeper to level the ridges, and leveling was not always achieved with conventional disc gangs because they throw soil in the same direction, at least for sections of the disc gangs which span over two or more ridges formed by the chisel plow.

In an effort to reduce the size of the ridges left by the chisel plow, the chisels were run at a deeper operating depth, e.g., 12–14 in. But this created other problems. For many years, it was believed that the ridge created between adjacent chisel shanks was desirable. The top of the ridge dries out first, which was believed to be desirable for preparing the soil early for planting. However, the resulting deep furrows left by the chisel shanks cause soil erosion problems; and large weeds growing in the bottom of the groove are difficult to kill in the wet conditions of spring and with the lighter tillage normally used in spring.

During the 1980's, various soil leveling arrangements were introduced to the marketplace. One general method was to mount a trailing toolbar behind the rear chisel shanks. Shanks with points of various configuration were attached to the trailing toolbar. The points were centered on the ridge between adjacent chisel shanks in the rear row to break up the ridge. This resulted in smaller ridges being formed closer together rather than, for example, one large ridge. Thus, for example, two smaller ridges spaced at 15" were formed rather than one large ridge with a 30" spacing. This formed a smoother soil surface and also permitted much shallower disc operation in the spring. However, the leveler shanks caused bunching of residue, or trash, and they frequently pulled bunches of residue to the surface leaving some fields with too much exposed residue. The leveler shanks would also frequently become plugged with residue, as the residue straddled the shank being pulled through the soil.

Some farmers installed single disc gangs on the rear of their chisel plows. This did not prove entirely satisfactory. One problem was ridging, since each gang moved the soil in only one direction. The random spacing of each disc blade relative to its associated shank also caused some of the blades to actually move soil toward rather than away from the ridge formed by a pair of adjacent chisel plow shanks. Other approaches made use of a large single blade placed between adjacent shanks to "knock down" the top of the ridge. This approach moved soil away from the ridge in one direction only and did not totally eliminate the soil ridging problem.

OBJECTS AND SUMMARY OF THE INVENTION

The present invention is intended to overcome the above problems and provide a more level soil profile after a single pass of the plow. Two disc blades are positioned, one on either side of the ridge, so that each disc moves soil away from the ridge in opposing directions and places it in an adjacent shank-formed groove. The discs of each pair of blades are spaced so that their leading edges are several inches apart laterally, one on each side of the center of the ridge. This leaves a narrow band or ridge between the disc blade pair, but it also creates shallow furrows adjacent the walls of the narrow that remains. The shallow furrows and the relatively narrow width of the ridge formed by the discs weaken the ridge so that the movement of the disc blades will cause some of the loose soil of the narrow ridge between the disc blades to fall into the small grooves created by the disc blades. The narrow ridge is further broken down under time and weather. The angular position of each blade is easily adjusted to fine tune soil leveling to the particular chisel plow with which it is used and to accommodate soil and operating conditions.

Accordingly, it is an object of the present invention to level the soil aft of a chisel plow in preparation for field tillage.

It is another object of the present invention to level the ridge formed by a chisel plow shank by laterally displacing soil to both sides of the ridge while allowing loose soil in the ridge to fill up the grooves formed by the lateral displacement of the ridge soil.

Yet another advantage of the present invention is to bury crop residue during field cultivation and fill up grooves formed by field working implements in leveling the soil.

A further object of the present invention is to minimize surface irregularities arising from field cultivation by lateral displacing ridged soil to both sides and allowing loose soil of the ridge to fall into adjacent lateral grooves in reducing the ridge and leveling the soil.

A still further object of the present invention is to reduce ridges and fill up grooves in the soil formed by a chisel plow shank in leveling the soil.

This invention contemplates apparatus for use on a farm implement having first and second spaced chisel plow and shank assemblies mounted to a first toolbar and defining respective first and second paths of travel as the implement is drawn over a field, wherein each shank forms a groove in the soil and adjacent plows, in combination, form a ridge as the implement is drawn over a field, where the apparatus levels the soil aft of the chisel plow and shank assemblies, the leveling apparatus comprising: a mounting assembly attached to a second, aft toolbar intermediate the first and second paths of travel of the chisel plow and shank assemblies; and first and second discs rotationally mounted to the mounting assembly and oriented at respective working angles to the direction of travel of the mounting assembly as the implement is drawn over a field, wherein the discs are concave and arranged in a non-overlapping manner along the direction of travel and the first disc is positioned forward of the second disc, and wherein the first and second discs displace a portion of the soil forming the ridge respectively toward the first and second paths of travel so as to fill the grooves formed by the first and second chisel plow shanks and wherein loose soil remaining in the ridge intermediate the discs falls laterally so as to fill up shallow grooves formed by the discs.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a plan view of a chisel plow with a disc soil leveler arrangement used in accordance with the present invention;

FIG. 2 is a side view of the disc soil leveler and chisel plow combination shown in FIG. 1 taken along site line 2-2 therein;

FIG. 3 is a top view of a disc leveler assembly including a pair of spaced discs in accordance with the present invention;

FIG. 4 is a front elevational view of a plurality of spaced disc leveler assemblies attached to a toolbar.

DETAILED DESCRIPTION

Figure 5:
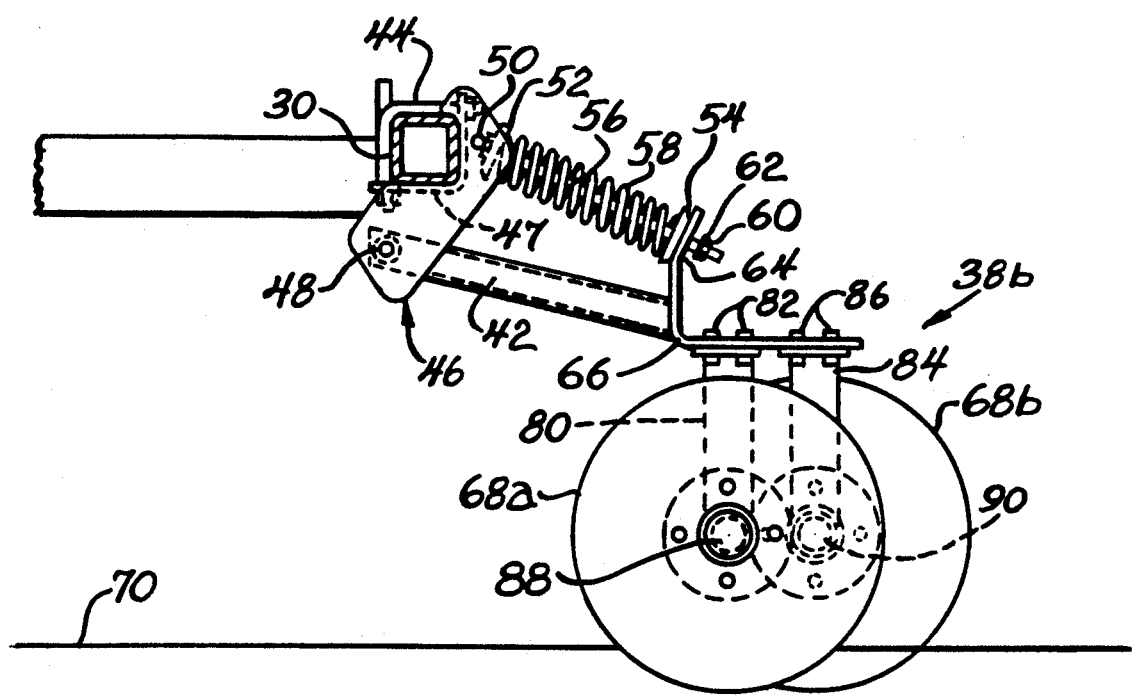
FIG. 5 is a side elevational view shown partially in phantom of a disc leveler assembly in accordance with the present invention.

Referring to FIG. 1, there is shown a plan view of a chisel plow with a disc leveler arrangement 10 in accordance with the present invention. A side view of the chisel plow with a disc leveler arrangement 10 shown in FIG. 1 is shown in FIG. 2.

The chisel plow 10 includes a frame comprised of a forward chisel plow toolbar 12, an aft leveler mounting bar 30, and first and second frame members 18a and 18b connecting the forward toolbar and the aft mounting bar in a spaced manner. A forward end of member 18a is securely coupled to the chisel plow toolbar 12 by means of the combination of a forward mounting plate 20a, an aft mounting plate 22a, and a plurality, four in the illustrated embodiment, of coupling bolts 24. Similarly, member 18b is coupled to the forward toolbar 12 by means of the combination of a forward mounting plate 20b, an aft mounting plate 22b, and a plurality of coupling bolts 26. Members 18a and 18b, forward toolbar 12 and rear bar 30 form a rigid frame adapted to be drawn by a traction vehicle.

The rear bar or beam 30 is securely coupled to respective aft ends of the mounting beams 18a, 18b by conventional means. Thus, the rear end of mounting beam 18a is attached to the leveler mounting beam 30 by means of the combination of a forward mounting plate 32b, an aft mounting plate 34a, and a pair of bolts 36a. Similarly, the aft end of mounting beam 18b is securely coupled to leveler mounting beam 30 by means of a forward mounting plate 32b, an aft mounting plate 34b, and a pair of bolts 36b. Each of the forward mounting plates 32a and 32b is provided with a plurality of apertures 33, as shown for forward mounting plate 32a in FIG. 2. Apertures 33 are arranged in a vertically spaced manner along the length from top to bottom of each of the forward mounting plates 32a, 32b. These apertures 33 are adapted to receive a pair of mounting bolts for allowing the height of the leveler mounting beam 30 above the soil 28 to be adjusted as desired. Positioning the mounting bolts 36a and 36b in the upper apertures 33 of the forward mounting plate 32a as shown in FIG. 2 lowers the operating height of the disc leveler assembly 38a causing the discs attached thereto to ride deeper in the soil 28.

Attached to the forward toolbar 12 along the length thereof are a plurality of conventional chisel plows 14a-14e. Each of the chisel plows 14a-14e is securely mounted to the forward toolbar 12 by means of a respective mounting bracket 16a-16e which includes a conventional arrangement of plates and mounting bolts. At the lower end of each of the shanks of plows 16a-16e is a chisel plow tip which travels through the soil 28 as the frame is pulled over a field during plowing.

Attached along the length of the leveler mounting beam 30 in a spaced manner are a plurality of disc leveler assemblies 38a-38d. Additional details of disc leveler assembly 38b are shown in FIGS. 3 and 5. Details of disc leveler assembly 38b will now be described, with this description equally applicable to the remaining disc leveler assembly 38a, 38c and 38d. As shown in FIG. 1, the two outer disc leveler assemblies 39a and 39b each include only a single respective disc 40a, 40b for moving soil inward toward the center of the chisel plow with disc leveler 10 in reducing ridges formed by chisel plows 14a and 14e, respectively.

Referring particularly to FIGS. 3 and 5, disc leveler assembly 38b is mounted to leveler mounting beam 30 by means of a mounting bracket 46 in combination with an L-shaped bolt 44. Mounting bracket 46 includes first and second spaced mounting plates 46a and 46b and a third intermediate, angled plate 47 welded to plates 46a and 46b and engaging the lower and rear sides of leveler mounting beam 30. Inserted through the mounting plates 46a, 46b are first and second pivot/mounting bolts 48 and 50. Respective sleeves 49 and 51 are disposed about the first and second pivot/mounting bolts 48, 50 and are disposed intermediate the first and second mounting plates 46a, 46b. Each of the first and second mounting plates 46a, 46b includes a respective recessed portion for receiving and engaging two sides of the leveler mounting beam 30.

An elongated spring bolt 56 has its upper end welded to the sleeve 51. Disposed about and positioned along the length of bolt 56, in proceeding from front to rear, are a forward casting 52 (which abuts the sleeve 51), a coil spring 58, and a rear casting 54. The spring 58 is positioned between and in contact with the forward and rear castings 52, 54. The distal end of spring bolt 56 is inserted through an aperture in a blade assembly mounting bracket 66. A combination of a nut 60 and a washer 62 maintains the blade assembly mounting bracket 66 coupled to the elongated bolt 56. Rear casting 54 engages a flat end portion of the blade assembly mounting bracket 66. Spring bolt 56 protrudes through and extends beyond mounting bracket 66 when the discs are operating in soil at a normal or "mean" level (see FIG. 2). If the soil level is lower than the normal or mean level, the spring 58 urges the bracket 66 downwardly (about pivot bolt 48, as will be clear) so that the discs may follow uneven ground contour. The rear of bracket 66 is horizontal at mean depth and may pivot both up and down when uneven soil is traversed. However, the spring is sized to exert a preload bias on the disc mounting bracket even in the fully extended position so that there is always a downward force on the discs provided they are within the design limits of soil contour.

The rear end of a pivot arm 42 is rigidly coupled to a forward portion of the blade assembly mounting bracket 66. The forward end of the pivot member 42 is provided with an aperture through which the first pivot/mounting bolt 48 is inserted for pivotally coupling the blade assembly mounting bracket 66 to mounting bracket 46. This arrangement urges mounting bracket 66 and discs 68a and 68b attached thereto downward while allowing for upward displacement of the discs upon impact with a rock or other obstruction in the soil to prevent damage to the discs.

Blade assembly mounting bracket 66 includes a flat, generally horizontal portion having two pairs of apertures for receiving two pairs of bolts 82 and 86 for attaching first and second L-shaped mounting brackets 80 and 84 to the blade assembly mounting bracket. Rotationally attached to a lower end of the first mounting bracket 80 by means of a first hub 88 is a first concave disc blade 68a. Similarly, attached to a lower end of the second mounting bracket 84 by means of a second mounting hub 90 is a second disc blade 68b. First and second discs 68a, 68b are free to rotate about their respective mounting hubs 88 and 90. Disposed on an upper end portion of the first mounting bracket 80 in contact with the blade assembly mounting bracket 68 are a first pair of positioning slots 72a and 72b. Similarly, positioned on the upper end portion of the second mounting bracket 84 in a spaced manner are a pair of positioning slots 74a and 74b. Bolts 82 are inserted through positioning slots 72a and 72b, while bolts 86 are inserted through positioning slots 74a and 74b. Positioning slots 72a, 72b allow the angular orientation of the first disc 68a to be fixed over a range of angular orientations relative to the direction of travel of the disc leveler assembly 38b. Similarly, positioning slots 74a and 74b allow the angular orientation of the second disc 68b to be adjusted as desired over a range of angular orientations relative to the direction of displacement, or path of travel, of the disc leveler assembly 38b. These positioning slots also allow the inter-disc spacing to be adjusted, as desired.

Operation of the chisel plow with disc leveler 10 will now be described with additional reference to FIG. 4 which is a vertical view taken in front of the disc leveler arrangement 10 along site line 4—4 of FIG. 1 and shows the soil in idealized form. In FIG. 4, letters A, B, and C represent the operating center lines of three adjacent chisel plow shanks. An idealized soil profile left by the chisel plows as illustrated by the undulating dashed line shows high ridges designated R separated by fairly deep grooves such as that designated G.

The leveler disc pairs are centered between adjacent chisel plow shanks to straddle a ridge R. The discs of each leveler pair pass over and engage soil just to the side of the center of the ridge formed by these adjacent shanks as shown in FIG. 4. The discs 68a, 68b are concave and are set at a "working angle" (see W, FIG. 1)—that is, the angle formed by the intersection of the plane formed by the peripheral edge of the disc and a line parallel to the direction of travel, as viewed from above. The discs 68a, 68b are laterally displaced from one another such that a gap, or space, designated S in FIG. 4 exists between the discs. Ideally, the space S extends along and is centered on the ridge R of the soil. Finally, the first disc 68a is positioned slightly forward of the second disc 68b of each pair.

As each of the disc leveler assemblies 38a–38d is moved along and engages one side of a ridge, the first and second discs 68a, 68b displace soil from the ridge laterally toward an adjacent furrow formed by a chisel plow shank; and the discs themselves form shallow furrows at F. Thus, the ridge is formed into a narrow ribbon or band of soil with adjacent shallow furrows formed by the discs. The ensuing motion and force of the discs loosens the soil and the narrow ridge breaks down as the discs pass, forming a resulting soil profile shown, in idealized form, by solid line P. As the ridge is broken down by the motion and force of discs 68a and 68b, the soil profile is not only reduced at the peak R of the ridge, but the soil in the narrow ribbon formed by the discs is moved laterally into the adjacent grooves formed by the discs so as to fill up the grooves, as illustrated by the solid soil profile lines in FIG. 4.

A small portion of the ridge intermediate the discs 68a and 68b is left following passage of the disc leveler assembly because of the gap between the discs. With time, loose soil in this remaining portion of the ridge is further broken down and moved either by wind or water down into the shallow furrows formed by each of the disc blades. This further levels the soil contour as shown by the idealized profile PP in the lower portion of FIG. 4 which represents a soil contour or profile following the passage of time after use of the chisel plow with disc leveler of the present invention.

The angular orientation relative to the direction of travel (sometimes referred to as the "working angle") of the discs 68a and 68b may be adjusted to compensate for the characteristics of the chisel plow "point" with which it is used. The working angle for the right disc of the center pair 38c is designated W in FIG. 1. As the working angle is increased (by rotating the right disc counterclockwise about a vertical axis or the left disc clockwise), a disc engages, and therefore throws more soil. Thus, for chisel plows which displace larger amounts of soil and form greater ridges, the working angle of the discs may be increased to displace more soil from the ridges. Similarly, for chisel plows forming smaller ridges, the working angle of the discs may be reduced so as to reduce the amount of soil laterally displaced by the discs. With one disc positioned forward of the other along their direction of travel, the movement of residue between the discs is facilitated and the possibility of clogging the discs with residue or wet soil is reduced.

Staggering the discs, fore and aft, of each leveler-pair of discs has the advantages of avoiding compacting the narrow band or ridge of soil left by the gap between the discs. This staggered arrangement also has the advantage of reducing any tendency of residue or soil clumps to plug between the convex non-working surfaces of a disc-pair. Moreover, it will be observed that the concave working surfaces of adjacent discs (such as left end disc 40a and the left disc of the pair 38a) are also offset or staggered along the direction of travel. This further facilitates the passage and handling of residue. If the working surfaces of adjacent discs were in lateral alignment, each would be heaping residue on the other, and this would decrease the ability of the implement to handle residue.

In order to further explain the operation of the present invention, a specific example will be given. However, this example is given for exemplary purposes only and to explain the teachings of the invention, not by way of limitation. With conventional chisel plows spaced at 30 in. laterally, the centers of the disc-pairs is also spaced at 30 in. but the disc-pairs are centered on a line parallel to the direction of travel of the implement and located midway between adjacent plow shanks. With the plows operating at a normal depth of approximately 8-10 in., ridges may be formed with a maximum height of approximately 8 in. Using dished discs having an outer diameter of 18 in. and drawing the implement at approximately 4-8 miles per hour, the working angle of the discs is adjusted in a range of approximately 5° (for a higher operating speed) to 15° (for a lower operating speed of 4 miles per hour). In this example, a nominal gap between the discs of a given disc-pair where the discs enter the soil may be about 3 in. The width of this gap, of course, will decrease as the working angles of the discs is increased because the leading edge of the discs will be set closer together. In this example, the nominal working depth of the discs is about 4 in. By way of another example, if parabolic chisel points are used so that a smaller ridge of about 5 in. is created, then the discs may be set to a shallower operating depth, nominally 3 in., and the working angle of the discs may be reduced because there is less ridge soil to be thrown to the side.

In these examples, it can be seen that the ridge, being formed of loose soil in the first place, may have a height of 5-8 in. above the soil "base line", which is the horizontal level of the soil before the implement traversed it. The furrows created by the discs adjacent the ridge will nominally be 3-4 in. below the soil base line so that the side walls of a ribbon formed between adjacent discs of a disc-pair may be typically in the range of 8-12 in. with the upper portion being formed of loosened soil. Although the width of such a ribbon is nominally 3 in., it will be realized that because of the curvature of the peripheral edges of the discs and adjustments to their orientation, the walls of the ridge are sloped downwardly and outwardly away from the center of the ridge. In any case, however, the upper portion of the ridge is unstable and the action of the moving discs will cause the top of the ridge to fall down into the shallow furrows created by the discs. Seasonal weathering will even further reduce the height of the discs and cause the soil profile to become even more level over time.

There has thus been shown a disc soil leveler assembly adapted for positioning aft of a pair of spaced chisel plow shanks and intermediate their respective paths of travel. Each soil leveler assembly includes a pair of laterally spaced rotating discs which displace soil from a ridge formed by the adjacent chisel plow shanks laterally into the grooves formed by each of these shanks. The gap between the discs allows a small ridge of soil to remain which, over time, fills in the shallow grooves formed by the discs on each side of the ridge. A smooth soil contour is thus provided which inhibits erosion and permits subsequent shallow tillage.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a farm implement having at least first and second spaced chisel plow and shank assemblies mounted to a first mounting bar and forming respective first and second furrows as said implement is drawn over a field, wherein adjacent shanks form a ridge of loose soil intermediate said furrows as said implement is drawn over said field, apparatus for leveling the soil aft of said chisel plow and shank assemblies, said apparatus comprising:
   a second mounting bar mounted behind said first mounting bar;
   a mounting assembly attached to said second mounting bar intermediate the first and second paths of travel of said chisel plow and shank assemblies; and
   first and second discs rotationally mounted to said mounting assembly and spaced apart to straddle the center of an associated ridge, said discs having their working surfaces facing outwardly and being angled in opposing directions to move soil outwardly in opposite lateral directions such that said first and second discs displace a portion of the soil forming the ridge to fill the furrows formed by said first and second chisel plow shanks and to loosen and break soil in the ridge between the discs, causing the loosened soil to fall laterally as the discs pass to fill up shallow grooves formed by said discs.

2. The apparatus of claim 1 wherein the leading edge of one of said discs of each pair is located forward of the other.

3. The apparatus of claim 2 wherein the working surfaces of said discs are concave and the working angles of said discs are set in the range of approximately 5°-15° such that the non-working surfaces of said discs engage and break down the band of soil in the gap between said discs.

4. The apparatus of claim 3 further comprising means for adjusting the working angle of said first and second discs relative to the direction of travel of said plows.

5. The apparatus of claim 4, wherein said means for adjusting the working angle of said first and second discs includes a plurality of mounting bolts coupled to said discs and a plurality of positioning slots in said mounting assembly, wherein said mounting bolts are inserted through said positioning slots for attaching said discs to said mounting assembly.

6. The apparatus of claim 1 further comprising means for adjusting the depth of said first and second discs in the soil.

7. The apparatus of claim 6 further comprising a plurality of beams coupling said first and second mounting bars, and wherein said means for adjusting the depth of said discs includes, in combination, a second plurality of mounting bolts and a mounting plate having a plurality of vertically arranged apertures for coupling said second mounting bar to aft end portions of said beams.

8. The apparatus of claim 1 wherein said mounting assembly further comprises coupling means for pivotally mounting said discs to allow said discs to be displaced upwardly and downwardly from a mean depth to follow soil contour.

9. The apparatus of claim 1 further comprising biasing means for urging said discs into engagement with the soil.

10. The apparatus of claim 1 wherein said mounting assembly further comprises a disc mounting bracket; means for mounting said discs to said disc mounting bracket; a pivot arm having a rear end rigidly connected to said disc mounting bracket and a forward end pivotally mounted to said second mounting bar for rotation about a horizontal axis transverse of the direction of travel of said plow; and coil spring means mounted between said second mounting bar and said disc mounting plate for urging said pivot arm to rotate relative to said second mounting bar and to urge said discs downwardly into soil engagement while permitting said discs to be raised.

11. The apparatus of claim 10 further comprising bracket means for mounting said leveling apparatus to said second mounting bar; a sleeve pivotally mounted to said bracket means; a spring bolt connected at its upper end to said sleeve and received coaxially in said spring and extending beyond said disc mounting bracket when said discs are operating at a normal depth to permit said discs to operate at a greater depth when under force of said spring.

12. The apparatus of claims 11 characterized in that said spring is preloaded to exert a force on said discs for all normal operating depths of said discs.

13. The apparatus of claim 11 further comprising first and second single discs on the left and right side of said implement outboard of associated chisel plows and having their work surfaces facing inwardly for moving soil inwardly and characterized in that adjacent ones of all of said discs are staggered in a fore and aft direction relative to each other for facilitating the flow of crop residue between adjacent discs having their working surfaces facing each other.

14. A primary tillage implement comprising, in combination, a plurality of laterally spaced chisel plows; and a soil leveler for leveling soil aft of each pair of chisel plows, wherein adjacent plows laterally displace soil so as to form an elevated ridge of soil intermediate the furrows left by the respective chisel plows; each soil leveler comprising: soil displacement means mounted to engage said elevated ridge of soil for displacing soil from said ridge outwardly toward said pair of chisel plows in filling the furrows formed by said chisel plows, said soil displacement means including first and second rotating discs set at working angles relative to the direction of travel and spaced apart to define a central gap for leaving a narrow portion of said elevated soil ridge formed by said chisel plows undisturbed, said discs being set at operating depths to form shallow grooves as they displace soil behind their associated chisel plows respectively, wherein loose soil in the undisturbed portion of said ridge falls into said shallow grooves formed by the discs after said discs have passed.

15. The apparatus of claim 14 characterized in that the working surfaces of each pair of cooperating pair of discs face outwardly relative to said gap and said working angles of said discs are set in the range of approximately 5°–15° whereby the non-working surfaces of said discs are adjacent each other and engage the loose soil in the undisturbed portion of said ridge to cause at least some of said soil to fall into said shallow grooves formed by said discs.

16. The apparatus of claim 14 wherein said discs are spaced such that the width of said narrow portion undisturbed by said discs is approximately three inches.

* * * * *